(12) United States Patent
Palanki et al.

(10) Patent No.: US 8,331,216 B2
(45) Date of Patent: Dec. 11, 2012

(54) CHANNEL AND INTERFERENCE ESTIMATION IN SINGLE-CARRIER AND MULTI-CARRIER FREQUENCY DIVISION MULTIPLE ACCESS SYSTEMS

(75) Inventors: Ravi Palanki, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1476 days.

(21) Appl. No.: 11/332,604

(22) Filed: Jan. 12, 2006

(65) Prior Publication Data
US 2007/0036179 A1 Feb. 15, 2007

Related U.S. Application Data

(60) Provisional application No. 60/708,239, filed on Aug. 9, 2005, provisional application No. 60/710,375, filed on Aug. 22, 2005.

(51) Int. Cl.
*H04J 11/00* (2006.01)
*H04W 36/00* (2009.01)
*H04B 7/00* (2006.01)
*H04K 1/10* (2006.01)

(52) U.S. Cl. ........ 370/208; 370/343; 370/480; 370/485; 455/436; 455/522; 375/260

(58) Field of Classification Search .................. 370/203, 370/208, 330, 343; 455/436
See application file for complete search history.

(56) References Cited

U.S. PATENT DOCUMENTS

| | | | |
|---|---|---|---|
| 6,289,038 B1 * | 9/2001 | Park | 375/131 |
| 6,515,980 B1 | 2/2003 | Bottomley | |
| 6,847,678 B2 | 1/2005 | Berezdivin et al. | |
| 6,925,128 B2 * | 8/2005 | Corral | 375/260 |
| 7,433,460 B2 * | 10/2008 | Budka et al. | 379/332 |
| 7,830,976 B2 | 11/2010 | Gorokhov et al. | |

(Continued)

FOREIGN PATENT DOCUMENTS

JP 2001177497 A 6/2001

(Continued)

OTHER PUBLICATIONS

International Search Report and Written Opinion—PCT/US2006/031135, International Search Authority—European Patent Office—Dec. 2, 2007.

(Continued)

*Primary Examiner* — George Eng
*Assistant Examiner* — Inder P Mehra
(74) *Attorney, Agent, or Firm* — Stanton Braden

(57) ABSTRACT

In a single-carrier frequency division multiple access (SC-FDMA) system, a receiver receives transmission symbols from a transmitter, determines a set of subbands used by the transmitter, processes the received transmission symbols for the set of subbands, obtains received pilot values for a transmitted pilot, and obtains received data values for transmitted data. The receiver may iteratively perform channel and interference estimation for the transmitter. The receiver selects an initial interference estimate, derives a channel estimate based on the received pilot values and the interference estimate, and derives a new interference estimate based on the received pilot values and the channel estimate. The receiver may repeat the derivation of the channel estimate and the interference estimate for multiple iterations. The receiver then performs data detection and/or receiver spatial processing on the received data values based on the channel estimate and the interference estimate.

43 Claims, 11 Drawing Sheets

U.S. PATENT DOCUMENTS

| | | |
|---|---|---|
| 8,085,875 B2 | 12/2011 | Gore et al. |
| 8,135,088 B2 | 3/2012 | Palanki et al. |
| 2002/0021307 A1 | 2/2002 | Glenn et al. |
| 2002/0163879 A1 | 11/2002 | Li et al. |
| 2004/0131007 A1* | 7/2004 | Smee et al. ............... 370/208 |
| 2004/0208254 A1* | 10/2004 | Lee et al. ................. 375/260 |
| 2004/0229615 A1* | 11/2004 | Agrawal .................. 455/436 |
| 2005/0135324 A1* | 6/2005 | Kim et al. ................ 370/343 |
| 2005/0163194 A1 | 7/2005 | Gore et al. |
| 2006/0008024 A1* | 1/2006 | Wight ...................... 375/267 |
| 2007/0014272 A1 | 1/2007 | Palanki et al. |
| 2007/0030914 A1* | 2/2007 | Ding et al. ............... 375/260 |
| 2007/0161361 A1* | 7/2007 | Vaisanen et al. .......... 455/302 |
| 2009/0023466 A1* | 1/2009 | Sutivong et al. .......... 455/522 |

FOREIGN PATENT DOCUMENTS

| | | |
|---|---|---|
| JP | 2002246958 A | 8/2002 |
| JP | 2003348046 A | 12/2003 |
| JP | 2004529527 T | 9/2004 |
| JP | 2006505229 T | 2/2006 |
| JP | 2007515899 T | 6/2007 |
| JP | 2008544650 T | 12/2008 |
| KR | 1020040091337 | 10/2004 |
| KR | 20050060631 A | 6/2005 |
| KR | 1020050061536 | 6/2005 |
| WO | WO2004038985 A2 | 5/2004 |
| WO | WO2005109711 A1 | 11/2005 |

OTHER PUBLICATIONS

M. Muck, X. Miet, M.D. Courville, P. Duhamel: "A successive minimum mean-square-error OFDM-data-symbol cancellation scheme for channel estimation in the Pseudo-random-Postfix OFDM context" IP.COM Journal, IPCOM000031047D, Sep. 8, 2004.

Gorokhov A, et al., "Iterative Interference Cancellation and Channel Estimation for Mobile OFDM" IEEE Transactions on Wireless Communications, IEEE Service Center, Piscataway, NJ, US, vol. 4, No. 1, Jan. 2005, pp. 238-245, XP011124957.

Jeremic A, et al., "OFDM Channel Estimation in the Presence of Interference" IEEE Transactions on Signal Processing, IEEE Service Center, New York, NY, US, vol. 52, No. 12, Dec. 2004, pp. 3429-3439, XP011122086.

Jeremy Laine: "Interference Estimation in a Multicellular OFDMA Environment, Master Thesis" Royal Institute of Technology, Jul. 2004, XP002417572.

LG Electronics, Uplink Multiple Access scheme,3GPP TSG RAN WG1 Ad Hoc on LTE, 3GPP, Jun. 15, 2005, R1-050638, p. 5, R1-050638, URL, http://gb50a/search/dir_doc/ftp.3gpp.org/tsg_ran/WG1_RL1/TSGR1_AH/LTE_AH_June-05/Docs/R1-050638/R1-050638.doc.

* cited by examiner

CHANNEL AND INTERFERENCE ESTIMATION IN SINGLE-CARRIER AND MULTI-CARRIER FREQUENCY DIVISION MULTIPLE ACCESS SYSTEMS

CLAIM OF PRIORITY UNDER 35 U.S.C. §119

The present Application for Patent claims priority to Provisional Application No. 60/708,239 entitled "CHANNEL AND INTERFERENCE ESTIMATION IN A SINGLE-CARRIER FREQUENCY DIVISION MULTIPLE ACCESS SYSTEM" filed Aug. 9, 2005 and Provisional Application No. 60/710,375 entitled "CHANNEL AND INTERFERENCE ESTIMATION IN A SINGLE-CARRIER FREQUENCY DIVISION MULTIPLE ACCESS SYSTEM" filed Aug. 22, 2005, and assigned to the assignee hereof and hereby expressly incorporated by reference herein.

BACKGROUND

I. Field

The present disclosure relates generally to communication, and more specifically to techniques for performing channel and interference estimation in a wireless communication system.

II. Background

In a wireless communication system, a transmitter typically encodes, interleaves, and modulates (or symbol maps) traffic data to obtain data symbols, which are modulation symbols for data. For a coherent system, the transmitter multiplexes pilot symbols with the data symbols, processes the multiplexed data and pilot symbols to generate a modulated signal, and transmits this signal via a wireless channel. The wireless channel distorts the transmitted signal with a channel response and further degrades the signal with noise and interference.

A receiver receives the transmitted signal and processes the received signal to obtain received data and pilot symbols. For coherent data detection, the receiver estimates the response of the wireless channel based on the received pilot symbols. The receiver then performs data detection on the received data symbols with the channel estimate to obtain data symbol estimates, which are estimates of the data symbols transmitted by the transmitter. The receiver then demodulates, deinterleaves, and decodes the data symbol estimates to obtain decoded data for the transmitter.

The noise and interference degrade the quality of the channel estimate. The noise and interference and the channel estimate have a large impact on data detection performance and hence affect the quality of the data symbol estimates as well as the reliability of the decoded data. There is therefore a need in the art for techniques to effectively perform channel and interference estimation in a wireless communication system.

SUMMARY

Techniques to perform channel and interference estimation in a single-carrier frequency division multiple access (SC-FDMA) system and a multi-carrier FDMA (MC-FDMA) system are described herein. An SC-FDMA system may utilize (1) interleaved FDMA (IFDMA) to transmit data and pilot on frequency subbands that are distributed across a frequency band or overall system bandwidth, (2) localized FDMA (LFDMA) to transmit data and pilot on a group of adjacent subbands, (3) enhanced FDMA (EFDMA) to transmit data and pilot on multiple groups of adjacent subbands, or (4) some other single-carrier multiplexing scheme. IFDMA is also called distributed FDMA, and LFDMA is also called narrowband FDMA, classical FDMA, and FDMA. An MC-FDMA system may utilize orthogonal frequency division multiple access (OFDMA) or some other multi-carrier multiplexing scheme.

In an embodiment, a receiver (e.g., a base station) receives transmission symbols from a transmitter (e.g., a terminal), determines a set of subbands used by the transmitter, processes the received transmission symbols for the set of subbands, obtains received pilot values for a pilot transmitted by the transmitter, and obtains received data values for data transmitted by the transmitter. The transmission symbols may have been generated with an SC-FDMA scheme such as IFDMA, LFDMA, or EFDMA. The receiver may iteratively perform channel and interference estimation for the transmitter. The receiver selects an initial interference estimate, derives a channel estimate based on the received pilot values and the interference estimate, and derives a new interference estimate based on the received pilot values and the channel estimate. The receiver may repeat the derivation of the channel estimate and the interference estimate for multiple iterations. The receiver may then perform data detection and/or receiver spatial processing on the received data values based on the channel estimate and the interference estimate.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The channel and interference estimation techniques described herein may be used for various communication systems. For example, these techniques may be used for an SC-FDMA system that utilizes IFDMA, LFDMA, or EFDMA, an MC-FDMA system that utilizes OFDMA, other FDMA systems, and so on. OFDMA utilizes orthogonal frequency division multiplexing (OFDM). Modulation symbols are sent in the time domain with SC-FDMA and in the frequency domain with MC-FDMA. In general, the techniques may be used for a system that utilizes one or more multiplexing schemes for the forward and reverse links. For example, the system may utilize (1) SC-FDMA (e.g., IFDMA, LFDMA or EFDMA) for both the forward and reverse links (2) one version of SC-FDMA (e.g., LFDMA) for one link and another version of SC-FDMA (e.g., IFDMA) for the other link, (3) MC-FDMA for both the forward and reverse links, (4) SC-FDMA for one link (e.g., reverse link) and MC-FDMA (e.g., OFDMA) for the other link (e.g., forward link), or (5) some other combination of multiplexing schemes. SC-FDMA, MC-FDMA, a combination of SC-FDMA and MC-FDMA, and/or some other multiplexing scheme may be used for each link to achieve the desired performance. For example, SC-FDMA and OFDMA may be used for a given link, with SC-FDMA being used for some subbands and OFDMA being used on other subbands. It may be desirable to use SC-FDMA on the reverse link to achieve lower peak-to-average power ratio (PAPR) and to relax the power amplifier requirements for the terminals. It may be desirable to use OFDMA on the forward link to potentially achieve higher system capacity.

The techniques described herein may be used for the forward and reverse links. The techniques may also be used for (1) an orthogonal multiple-access system in which all users within a given cell or sector are orthogonal in time, frequency and/or code and (2) a quasi-orthogonal multiple-access system in which multiple users within the same cell or sector may transmit simultaneously on the same frequency at the same time. For clarity, much of the description below is for an orthogonal SC-FDMA system.

Figure 1:
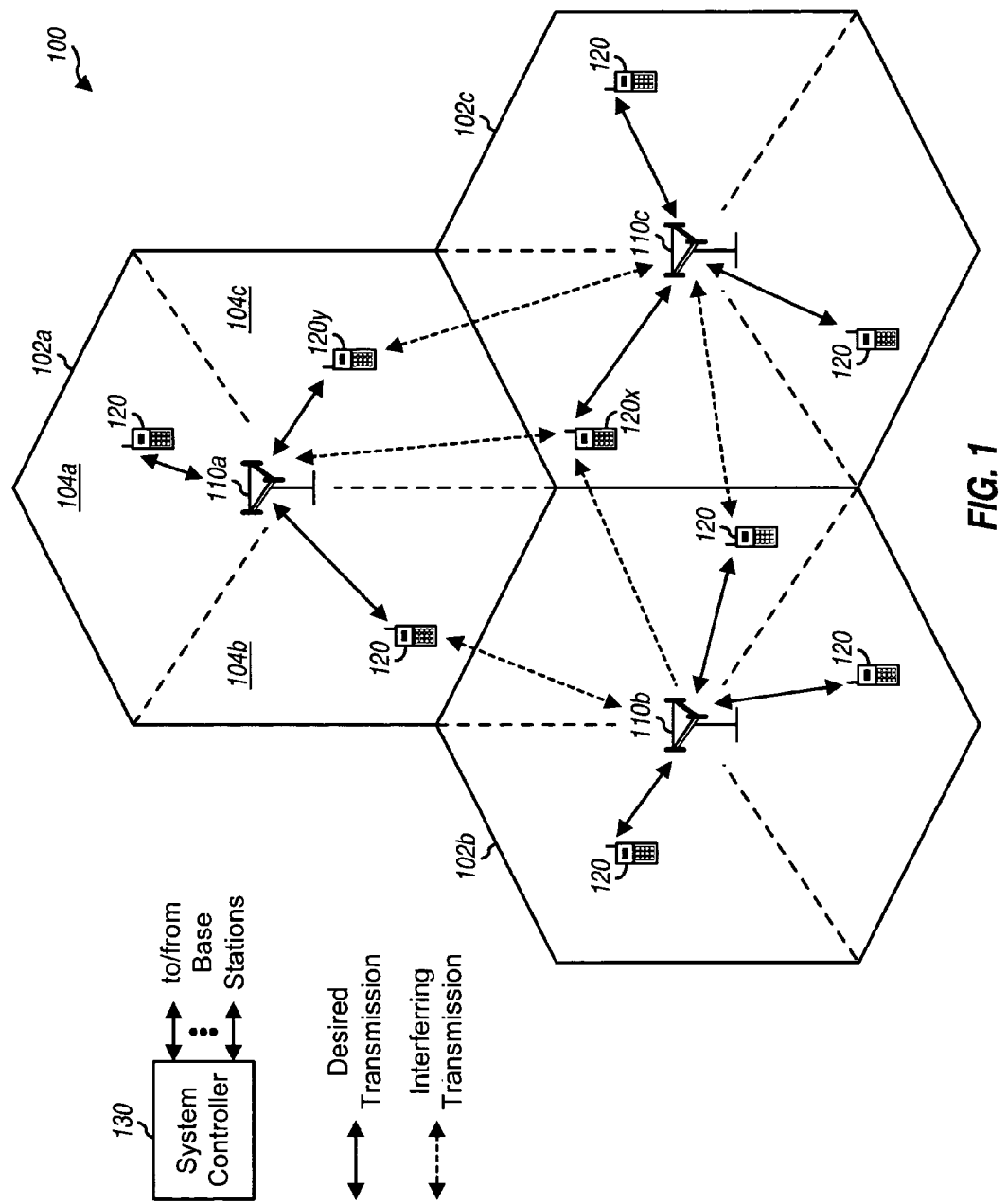
FIG. 1 shows a wireless communication system.

FIG. 1 shows a wireless communication system 100 with multiple base stations 110 and multiple terminals 120. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell.

Terminals 120 are typically dispersed throughout the system, and each terminal may be fixed or mobile. A terminal may also be called a mobile station, a user equipment, or some other terminology. A terminal may be a wireless device, a cellular phone, a personal digital assistant (PDA), a wireless modem card, and so on. Each terminal may communicate with one or possibly multiple base stations on the forward and reverse links at any given moment. The forward link (or downlink) refers to the communication link from the base stations to the terminals, and the reverse link (or uplink) refers to the communication link from the terminals to the base stations.

For a centralized architecture, a system controller 130 couples to base stations 110 and provides coordination and control for these base stations. For a distributed architecture, the base stations may communicate with one another as needed.

The techniques described herein may be used for a system with sectorized cells as well as a system with un-sectorized cells. For clarity, the following description is for a system with sectorized cells. The term "base station" is used generically for a fixed station that serves a sector as well as a fixed station that serves a cell. The terms "terminal" and "user" are used interchangeably, and the terms "sector" and "base station" are also used interchangeably. A serving base station/sector is a base station/sector with which a terminal communicates. A neighbor base station/sector is a base station/sector with which a terminal is not in communication.

System 100 may utilize IFDMA, LFDMA, and/or EFDMA. The subband structures and symbol generation for IFDMA, LFDMA, and EFDMA are described below.

Figure 2A:
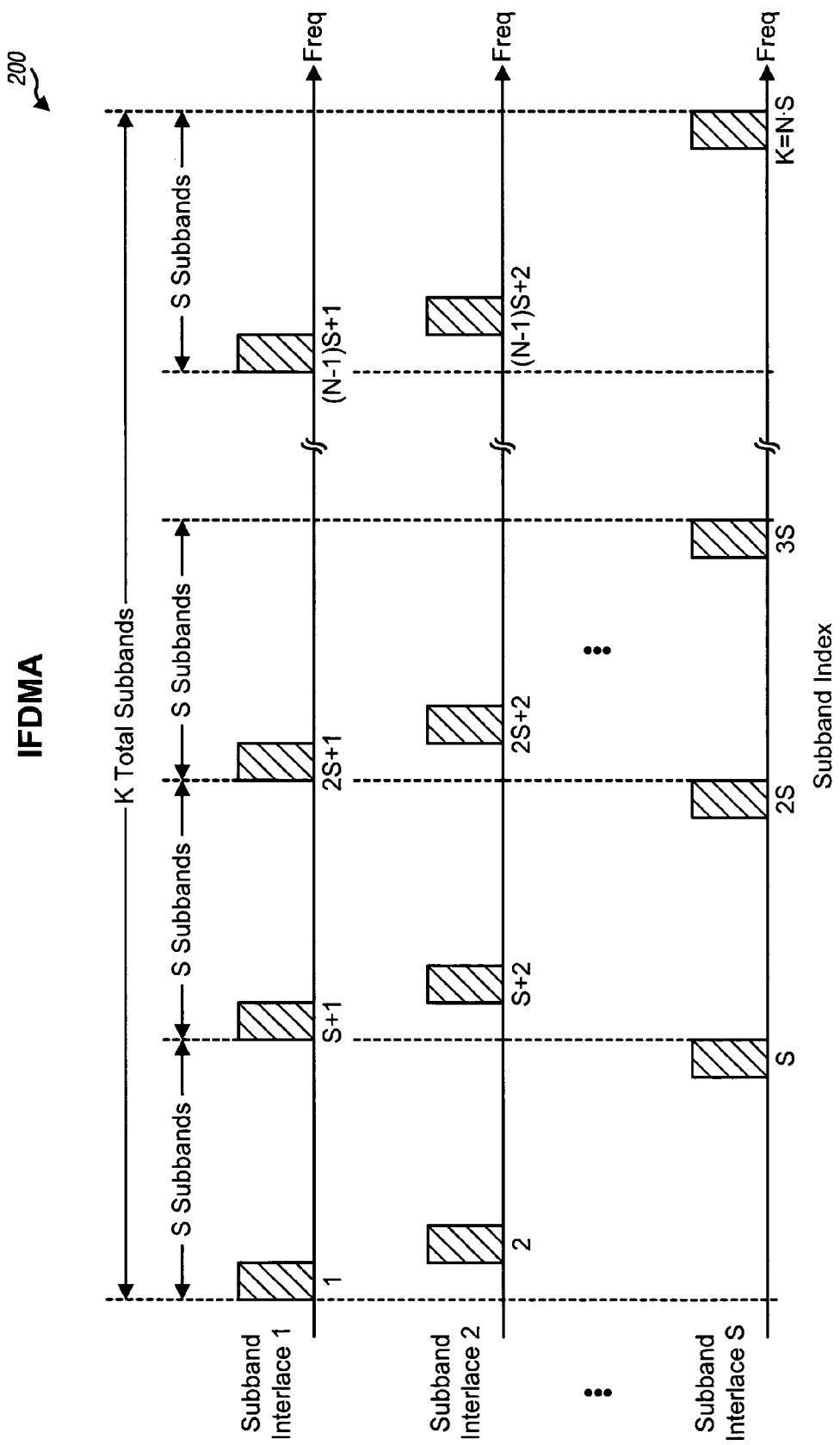
FIG. 2A shows an exemplary subband structure for IFDMA.

FIG. 2A shows an exemplary subband structure 200 for IFDMA. The overall system bandwidth of BW MHz is partitioned into multiple (K) orthogonal subbands that are given indices of 1 through K, where K may be any integer value. The spacing between adjacent subbands is BW/K MHz. For simplicity, the following description assumes that all K subbands are usable for transmission. For subband structure 200, the K subbands are arranged into S disjoint or non-overlapping subband sets, which are also called interlaces. The S interlaces are disjoint in that each of the K subbands belongs in only one interlace. In an embodiment, each interlace contains N subbands that are uniformly distributed across the K total subbands, consecutive subbands in each interlace are spaced apart by S subbands, and interlace u contains subband u as the first subband, where $K=S \cdot N$ and $u \in \{1, \ldots, S\}$. In general, a subband structure may include any number of interlaces, each interlace may contain any number of subbands, and the interlaces may contain the same or different numbers of subbands. Furthermore, N may or may not be an integer divisor of K, and the N subbands may or may not be uniformly distributed across the K total subbands.

Figure 2B:
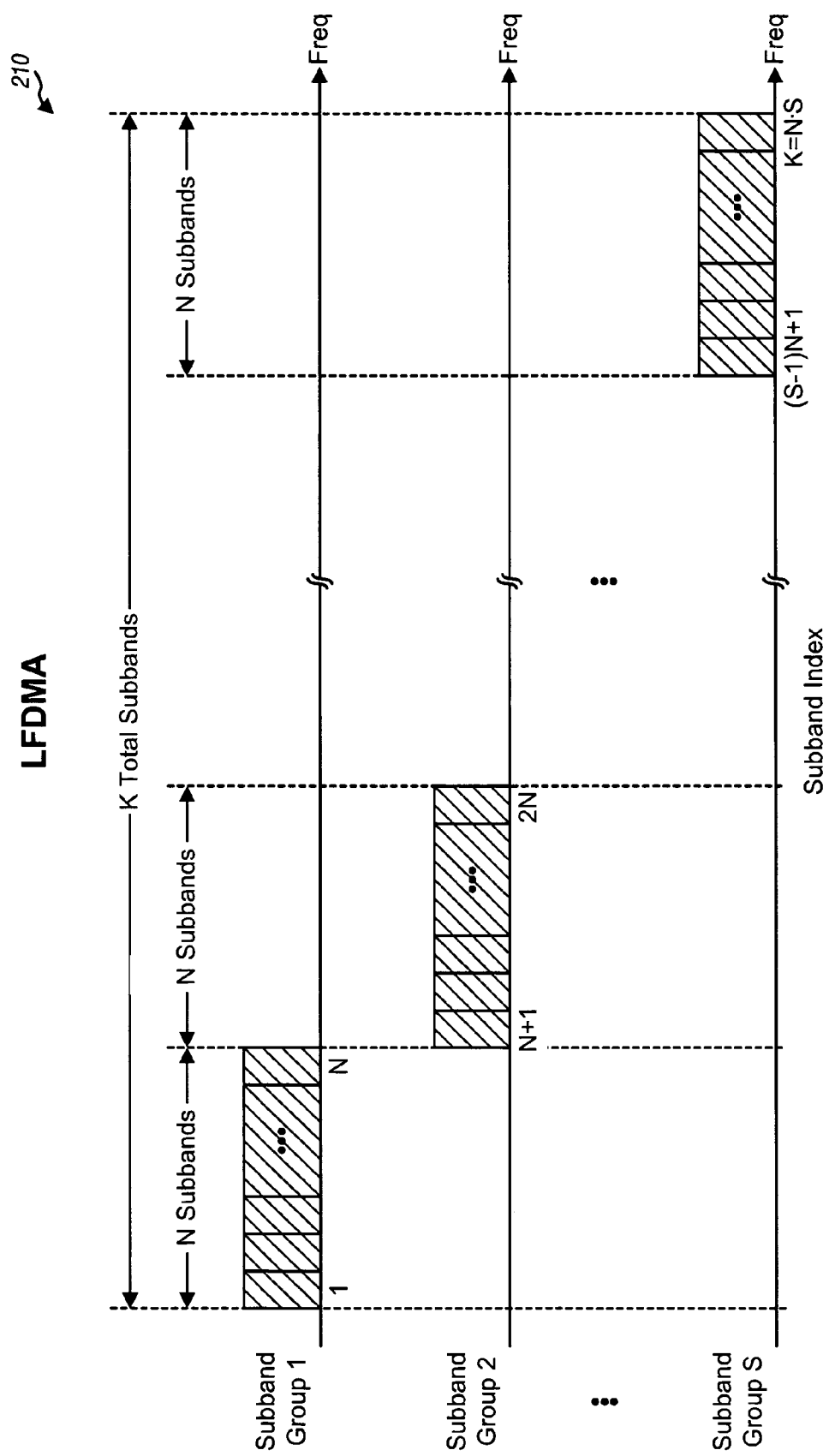
FIG. 2B shows an exemplary subband structure for LFDMA.

FIG. 2B shows an exemplary subband structure 210 for LFDMA. For subband structure 210, the K total subbands are arranged into S non-overlapping groups. In an embodiment, each group contains N subbands that are adjacent to one another, and group v contains subbands $(v-1) \cdot N+1$ through $v \cdot N$, where v is the group index and $v \in \{1, \ldots, S\}$. N and S for subband structure 210 may be the same or different from N and S for subband structure 200. In general, a subband structure may include any number of groups, each group may contain any number of subbands, and the groups may contain the same or different numbers of subbands.

Figure 2C:
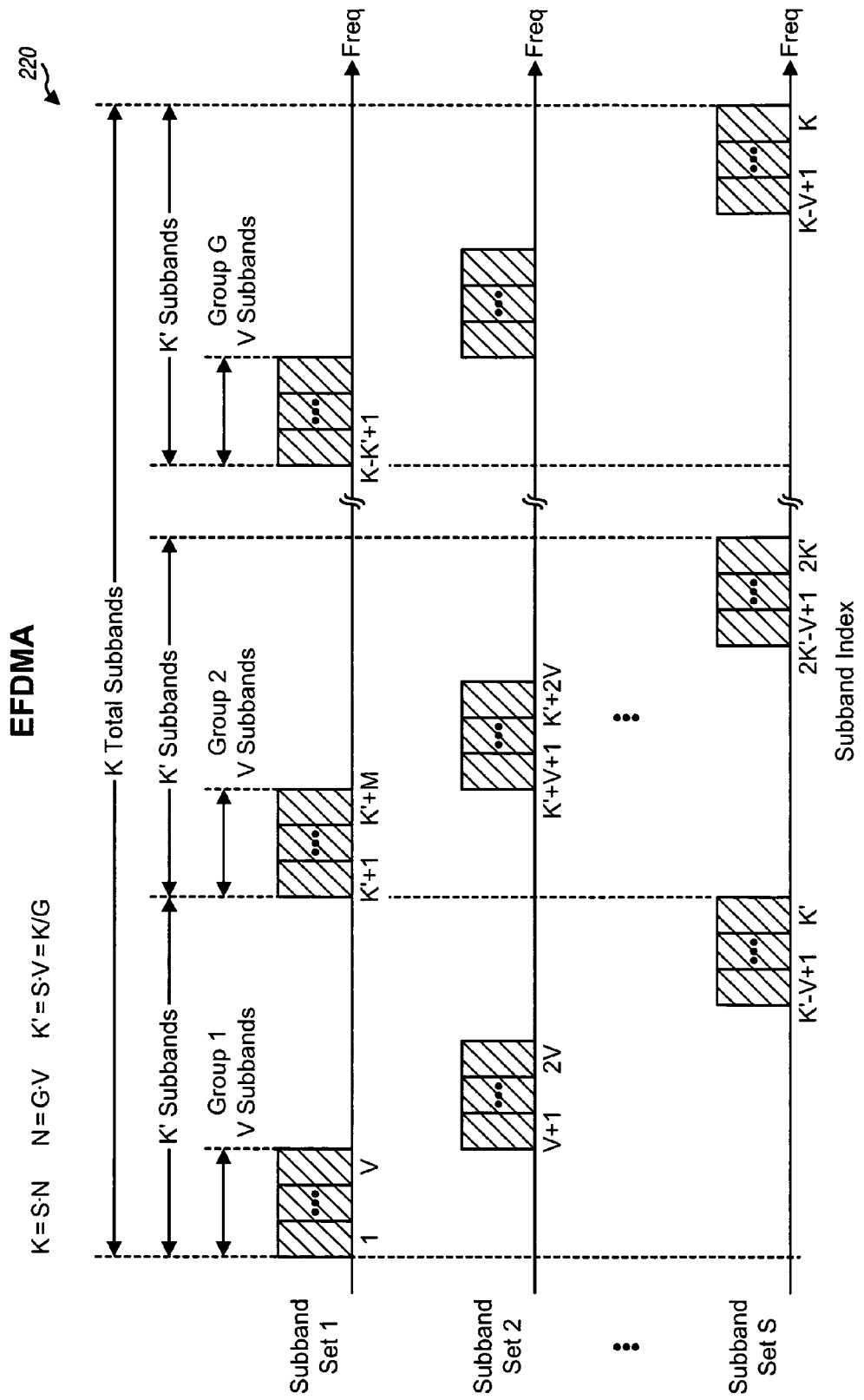
FIG. 2C shows an exemplary subband structure for EFDMA.

FIG. 2C shows an exemplary subband structure 220 for EFDMA. For subband structure 220, the K total subbands are arranged into S non-overlapping sets, with each set including G groups of subbands. In an embodiment, the K total subbands are distributed to the S sets as follows. The K total subbands are first partitioned into multiple frequency ranges, with each range containing $K'=K/G$ consecutive subbands. Each frequency range is further partitioned into S groups, with each group including V consecutive subbands. For each frequency range, the first V subbands are allocated to set 1, the next V subbands are allocated to set 2, and so on, and the last V subbands are allocated to set S. Set s, for $s=1, \ldots, S$, includes subbands having indices k that satisfy the following: $(s-1) \cdot V \leq k$ modulo $(K/G) < s \cdot V$. Each set contains G groups of V consecutive subbands, or a total of $N=G \cdot V$ subbands. In general, a subband structure may include any number of sets, each set may contain any number of groups and subbands, and the sets may contain the same or different numbers of subbands. For each set, the groups may contain the same or different numbers of subbands and may be uniformly or non-uniformly distributed across the system bandwidth.

System 100 may also utilize a combination of IFDMA, LFDMA, and/or EFDMA. For example, multiple interlaces may be formed for each subband group, and each interlace may be allocated to one or more users for transmission. As another example, multiple subband groups may be formed for each interlace, and each subband group may be allocated to one or more users for transmission. IFDMA, LFDMA, EFDMA, and variants and combinations thereof may be considered as different versions of SC-FDMA. In general, the techniques described herein may be used for any subband structure with any number of subband sets and where each subband set may include any number of subbands that may be arranged in any manner. For each subband set, (1) the subbands may be individually and either uniformly or non-uniformly distributed across the system bandwidth, (2) the subbands may be adjacent to one another in one group, or (3) the subbands may be distributed in multiple groups, where each group may be located anywhere in the system bandwidth and may contain one or multiple subbands.

Figure 3A:
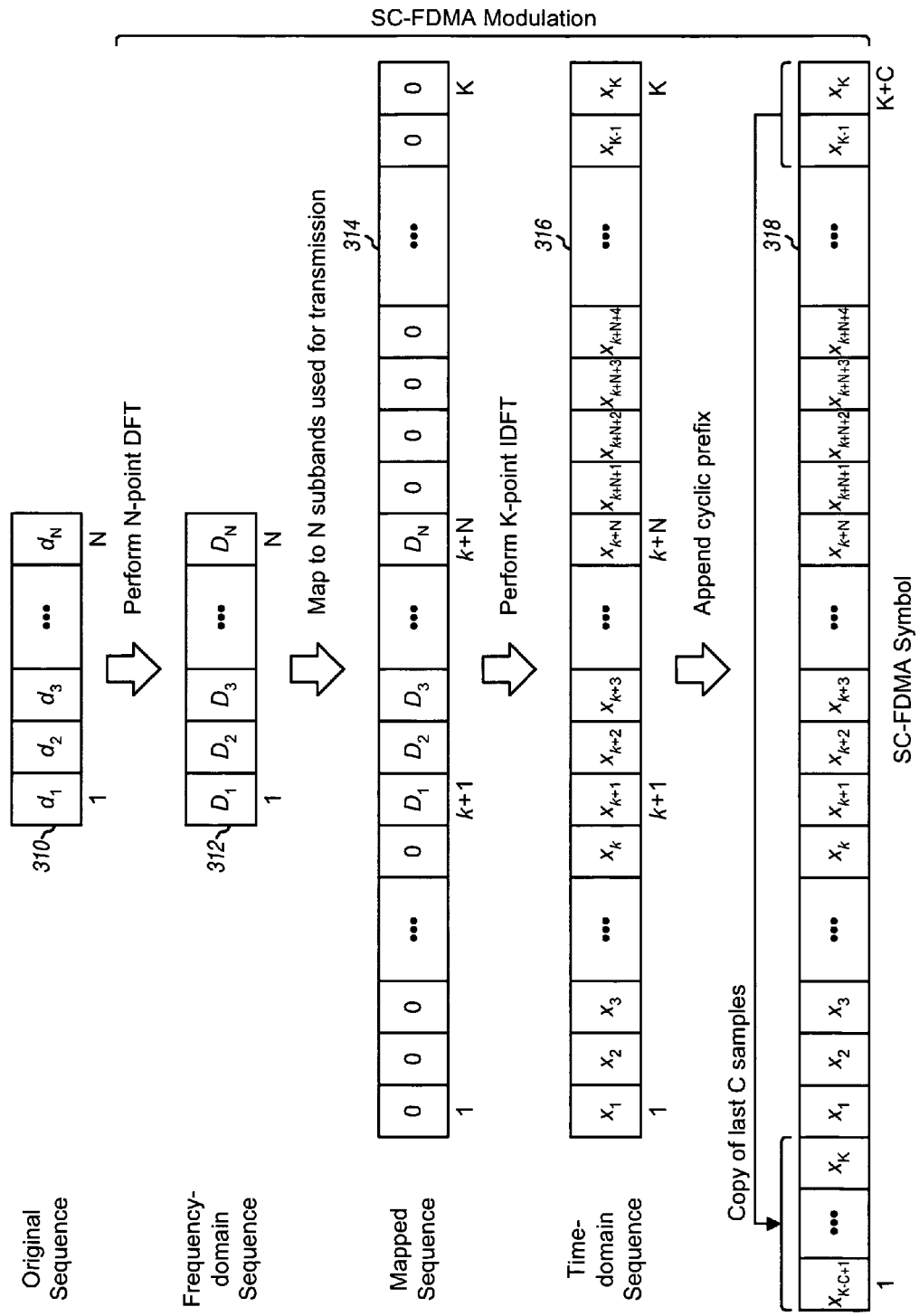
FIG. 3A shows the generation of an IFDMA, LFDMA or EFDMA symbol.

FIG. 3A shows the generation of an IFDMA symbol for one interlace, an LFDMA symbol for one subband group, or an EFDMA symbol for one subband set. An original sequence of N modulation symbols to be transmitted in one symbol period on the interlace, subband group, or subband set is denoted as $\{d_1, d_2, d_3, \ldots, d_N\}$ (block 310). The original sequence is transformed to the frequency domain with an N-point discrete Fourier transform (DFT) to obtain a sequence of N frequency-domain values (block 312). The N frequency-domain values are mapped onto the N subbands used for transmission, and K−N zero values are mapped onto the remaining K−N subbands to generate a sequence of K values (block 314). The N subbands used for transmission are adjacent to one another for LFDMA (as shown in FIG. 3A), are distributed across the K total subbands for IFDMA (not shown in FIG. 3A), and are in multiple groups of subbands for EFDMA (also not shown in FIG. 3A). The sequence of K values is then transformed to the time domain with a K-point inverse discrete Fourier transform (IDFT) to obtain a sequence of K time-domain output samples (block 316).

The last C output samples of the sequence are copied to the start of the sequence to form an IFDMA, LFDMA, or EFDMA symbol that contains K+C output samples (block 318). The C copied output samples are often called a cyclic prefix or a guard interval, and C is the cyclic prefix length. The cyclic prefix is used to combat intersymbol interference (ISI) caused by frequency selective fading.

Figure 3B:
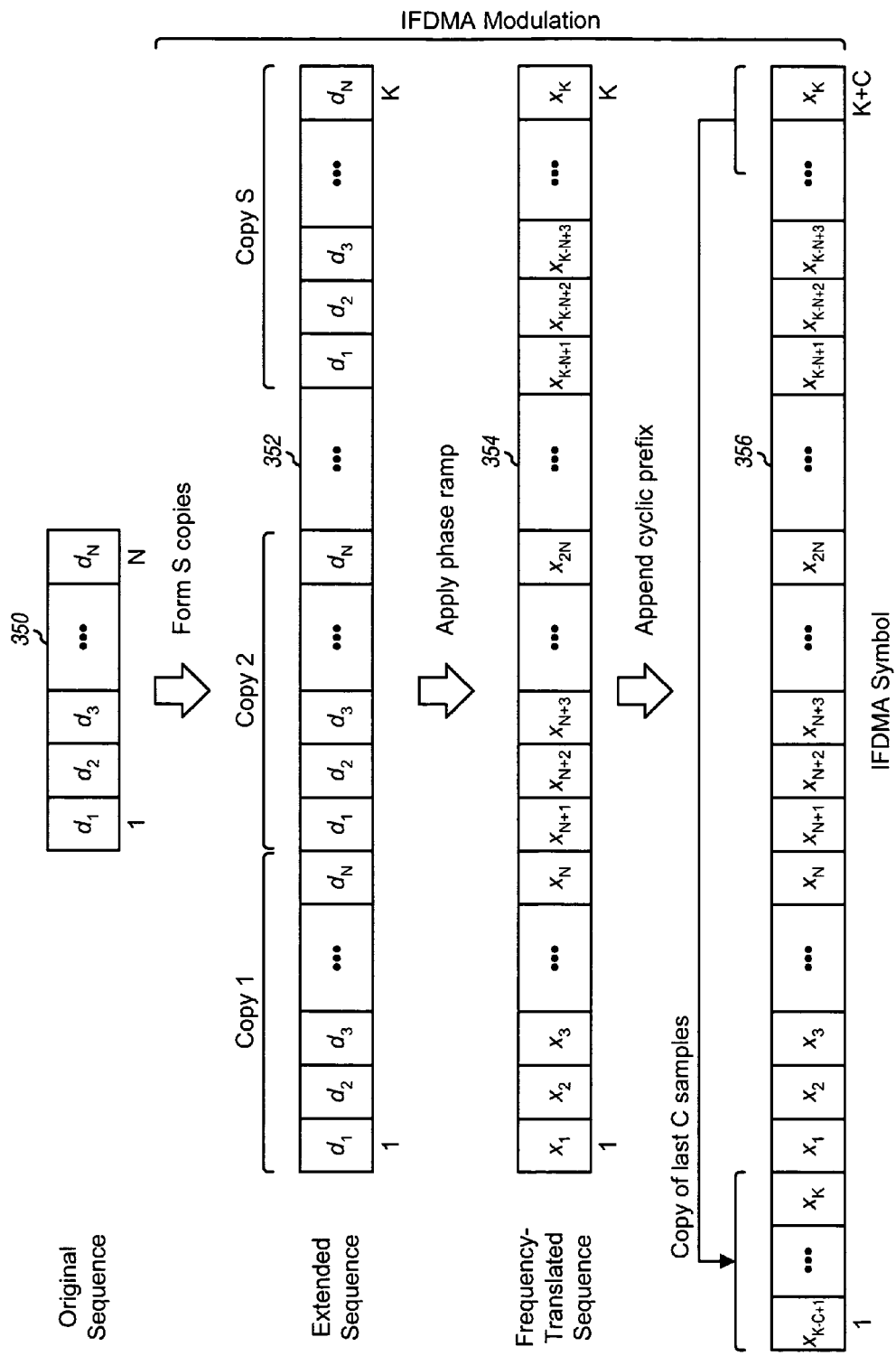
FIG. 3B shows the generation of an IFDMA symbol.

FIG. 3B shows the generation of an IFDMA symbol for one interlace for the case in which N is an integer divisor of K and the N subbands are uniformly distributed across the K total subbands. An original sequence of N modulation symbols to be transmitted in one symbol period on the N subbands in interlace u is denoted as $\{d_1, d_2, d_3, d_N\}$ (block 350). The original sequence is replicated S times to obtain an extended sequence of K modulation symbols (block 352). The N modulation symbols are sent in the time domain and collectively occupy N subbands in the frequency domain. The extended sequence has a comb-like frequency spectrum that occupies interlace 1 in FIG. 2A.

The extended sequence is multiplied with a phase ramp to obtain a frequency-translated sequence of K output samples (block 41 354). Each output sample in the frequency-translated sequence may be generated as $x_n = d_n \cdot e^{-j2\pi \cdot (n-1) \cdot (u-1)/K}$, where $d_n$ is the n-th modulation symbol in the extended sequence and $x_n$ the n-th output sample in the frequency-translated sequence. The multiplication with the phase ramp $e^{-j2\pi \cdot (n-1) \cdot (u-1)/K}$ in the time domain results in the frequency-translated sequence occupying interlace u in the frequency domain. The last C output samples of the frequency-translated sequence are copied to the start of the frequency-translated sequence to form an IFDMA symbol that contains K+C output samples (block 356).

The processing shown in FIG. 3A may be used to generate IFDMA, LFDMA, and EFDMA symbols for any values of N and K. The processing shown in FIG. 3B may be used to generate an IFDMA symbol for the case in which N is an integer divisor of K and the N subbands are uniformly distributed across the K total subbands. IFDMA, LFDMA, and EFDMA symbols may also be generated in other manners.

As used herein, a transmission symbol may be an SC-FDMA symbol generated with an SC-FDMA scheme or an MC-FDMA symbol generated with an MC-FDMA scheme. An SC-FDMA symbol may be an IFDMA symbol, an LFDMA symbol, or an EFDMA symbol. An MC-FDMA symbol may be an OFDM symbol. The K+C output samples of a transmission symbol are transmitted in K+C sample periods, one output sample in each sample period. A symbol period is the duration of one transmission symbol and is equal to K+C sample periods. A sample period is also called a chip period.

As generically used herein, a subband set is a set of subbands, which may be an interlace for IFDMA, a subband group for LFDMA, or a set of multiple subband groups for EFDMA. For the reverse link, S users may simultaneously transmit on S subband sets (e.g., S interlaces or S subband groups) to a base station without interfering with one another. For the forward link, a base station may simultaneously transmit on the S subband sets to S users without interference.

Figure 4:
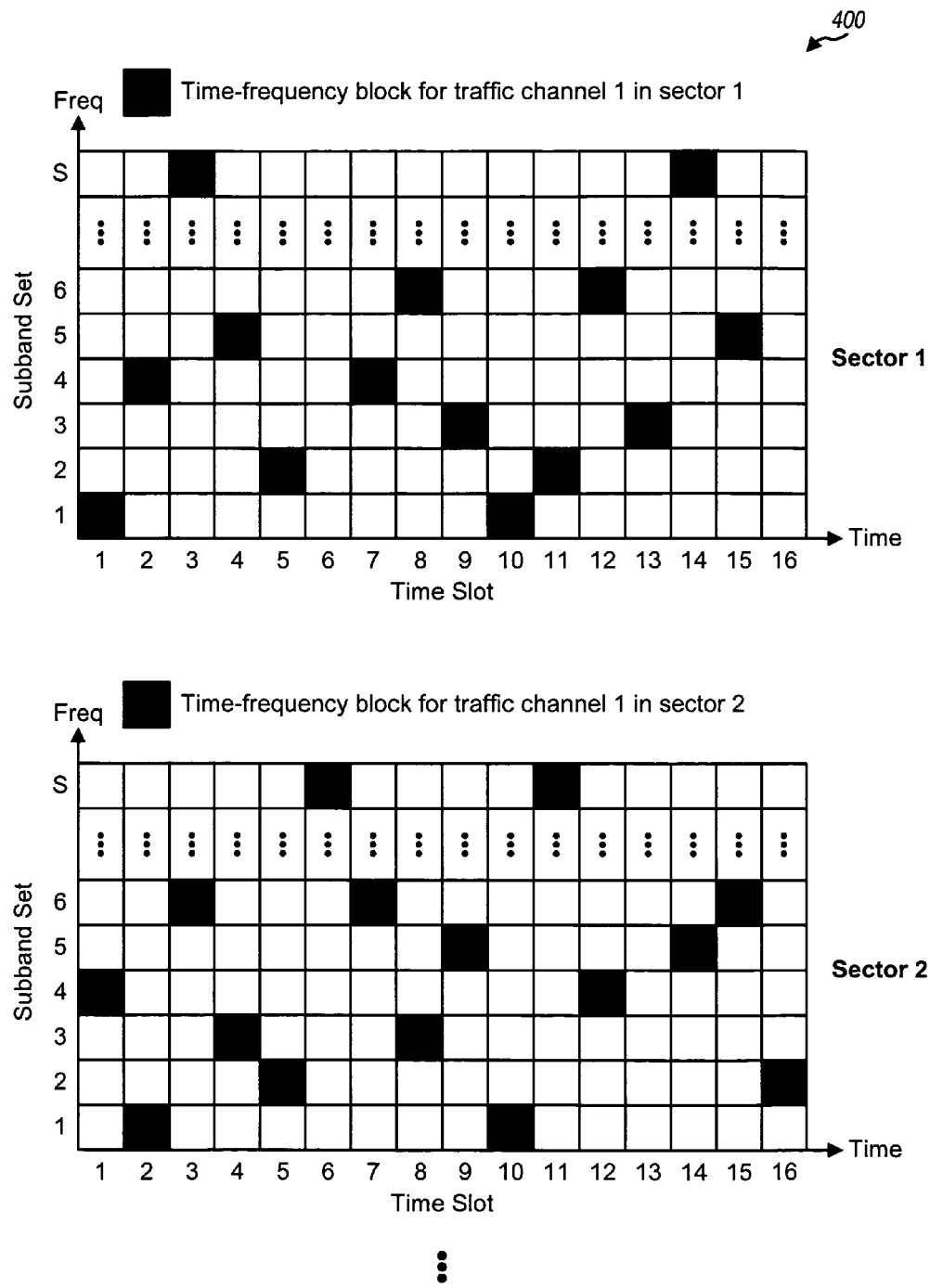
FIG. 4 shows a frequency hopping (FH) scheme.

FIG. 4 shows a frequency hopping (FH) scheme 400 that may be used for system 100. Frequency hopping can provide frequency diversity and interference randomization for each user. With frequency hopping, a user may be assigned a traffic channel that is associated with a hop pattern that indicates which subband set(s), if any, to use in each time slot. A hop pattern is also called an FH pattern or sequence, and a time slot is also called a hop period. A time slot is the amount of time spent on a given subband set and typically spans multiple symbol periods. The hop pattern may pseudo-randomly select different subband sets in different time slots. Frequency diversity is achieved by selecting all or many of the S subband sets over some number of time slots.

A channel set may be defined for each sector. The channel set contains S traffic channels that are orthogonal to one another so that no two traffic channels map to the same subband set in any given time slot. This avoids intra-sector interference among users assigned with the traffic channels in the channel set. Each traffic channel is mapped to a specific sequence of time-frequency blocks based on the hop pattern for that traffic channel. A time-frequency block is a specific set of subbands in a specific time slot. Up to S users may be assigned with the S traffic channels and would be orthogonal to one another. The traffic channels in the channel set for each sector may be pseudo-random with respect to the traffic channels in the channel sets for the neighbor sectors. This randomizes the interference observed by a given user due to transmissions from other users in the neighbor sectors.

FIG. 4 shows an exemplary mapping of traffic channel 1 for each sector to a sequence of time-frequency blocks. Traffic channels 2 through S for each sector may be mapped to vertically and circularly shifted versions of the time-frequency block sequence for traffic channel 1. For example, traffic channel 2 for sector 1 may be mapped to subband set 2 in time slot 1, subband set 5 in time slot 2, subband set 1 in time slot 3, and so on.

In general, to facilitate interference estimation and possibly improve the overall system performance, the subbands and symbol periods available for transmission may be partitioned into time-frequency blocks, with or without frequency hopping. The sectors may be operated in a synchronous manner so that a given time-frequency block for a given sector observes interference from a specific time-frequency block for each of the neighbor sectors. The synchronous operation also facilitates interference estimation since the interference estimate obtained for a given time-frequency block in a given sector is due to a limited number of interfering transmissions from the neighbor sectors, e.g., one interfering transmission from each neighbor sector. If the sectors are not synchronized, then each time-frequency block may observe many interfering transmissions from neighbor sectors and hence the average interference seen by each time-frequency block may be similar, even though different modulation symbols may see different interference values. To also facilitate interference estimation, a common minimum subband assignment size may be used across sectors. For example, if all sectors have minimum assignments of 16 subbands, then interference estimation may be performed across 16 subbands, which may evenly distributed for IFDMA or contiguous for LFDMA.

Referring back to FIG. 1, terminal 120x is located near the coverage edge of base station 110c and may cause larger amounts of interference to other terminals communicating with base stations 110a and 110b. Conversely, terminal 120y is located near serving base station 110a and may cause small amounts of interference to other terminals communicating with base stations 110b and 110c. If the transmissions from the terminals in system 100 are synchronized, then the terminals communicating with base stations 110a and 110b may transmit at lower rates when transmitting on the same time-frequency block as terminal 120x. The terminals communicating with base stations 110b and 110c may transmit at higher rates when transmitting on the same time-frequency block as terminal 120y.

Figure 5:
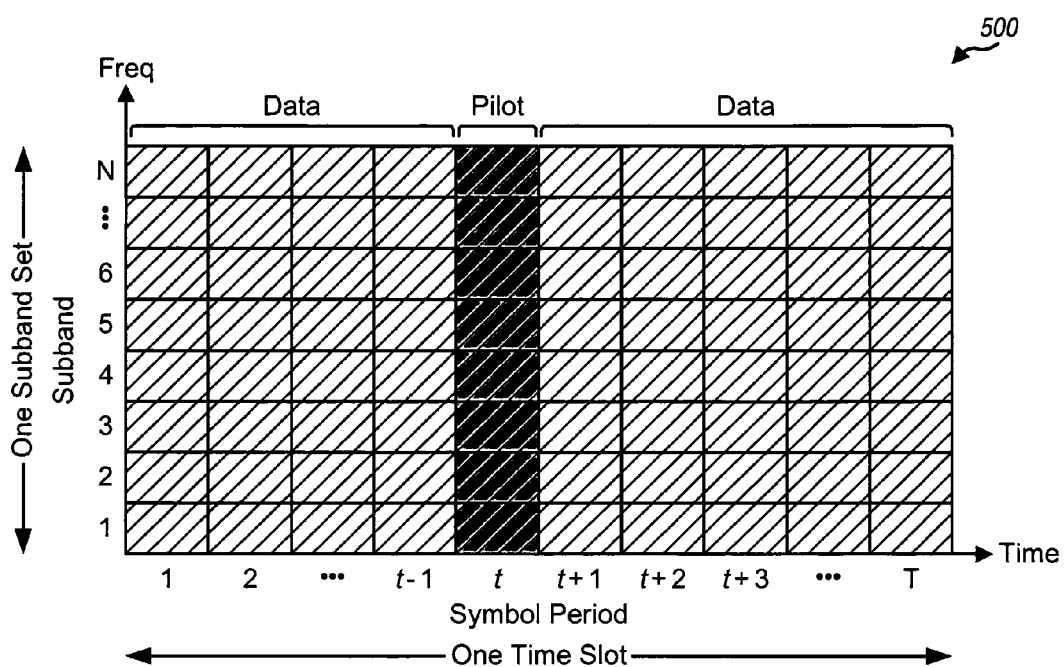
FIG. 5 shows an exemplary transmission for one time-frequency block.

FIG. 5 shows an exemplary transmission scheme 500 for one time-frequency block. For the example shown in FIG. 5, a transmitter transmits data in symbol periods 1 through t−1, then pilot in symbol period t, and then data in symbol periods t+1 through T. The data may include traffic data, signaling, and so on. The transmitter may transmit data and pilot on the same or different subbands. For example, the transmitter may transmit data and pilot on all N subbands in different symbol periods of a time-frequency block, transmit data on all N subbands and pilot on a subset of these subbands, transmit data on a subset of the N subbands and pilot on another subset of these subbands, and so on. In general, the subbands used for pilot transmission (which are called pilot subbands) may or may not be the same as the subbands used for data transmission (which are called data subbands).

Multiple users in the same sector may transmit pilots on the same subband set in the same symbol period(s). In this case, the pilots for these users may be multiplexed using time division multiplexing (TDM), code division multiplexing (CDM), interleaved frequency division multiplexing (IFDM), localized frequency division multiplexing (LFDM), and/or some other multiplexing scheme.

Figure 6A:
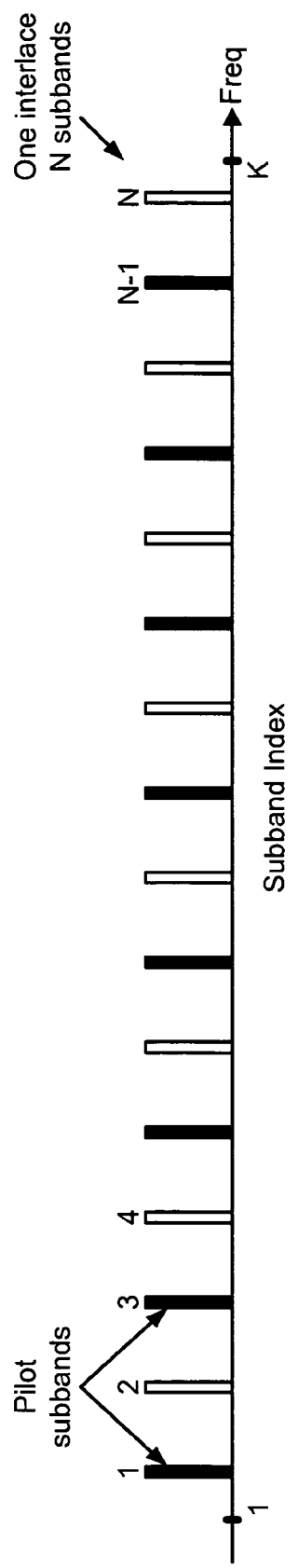
FIG. 6A shows an exemplary pilot for IFDMA.

FIG. 6A shows an exemplary pilot for IFDMA. The N subbands in an interlace are given indices of 1 through N and are partitioned into multiple subsets. For the example shown in FIG. 6A, the interlace is partitioned into two subsets, the first subset contains subbands with odd-numbered indices, and the second subset contains subbands with even-numbered indices. A user may transmit pilot on the subbands in one subset. The subbands in the other subset(s) may be used to transmit data (e.g., signaling) or may be allocated to other users for pilot transmission.

Figure 6B:
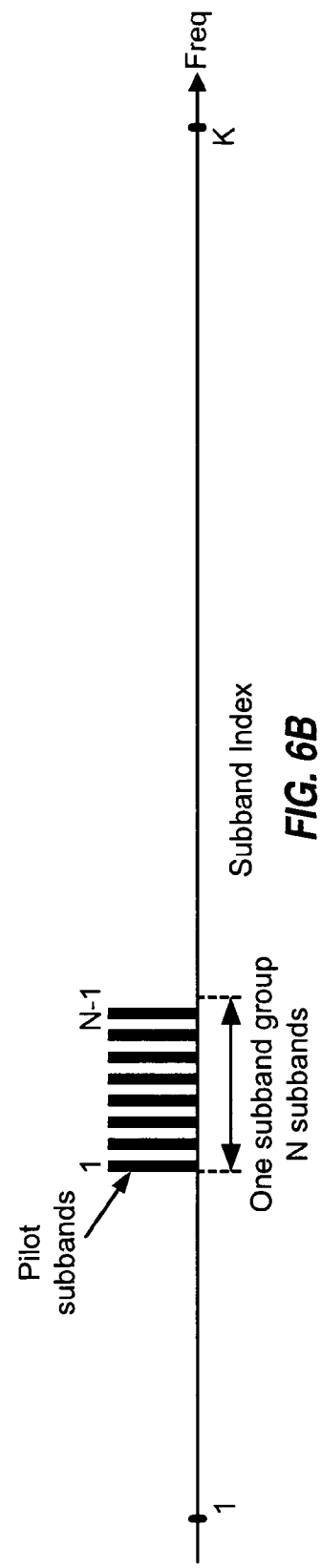
FIG. 6B shows an exemplary pilot for LFDMA.

FIG. 6B shows an exemplary pilot for LFDMA. The N subbands in a subband group are given indices of 1 through N and are partitioned into multiple subsets. For the example shown in FIG. 6B, the subband group is partitioned into two subsets, the first subset contains subbands with odd-numbered indices, and the second subset contains subbands with even-numbered indices. A user may transmit pilot on the subbands in one subset. The subbands in the other subset(s) may be used to transmit data (e.g., signaling) or may be allocated to other users for pilot transmission.

To recover a transmission sent by a transmitter (e.g., a terminal) to a receiver (e.g., a base station), the receiver may derive a channel estimate and an interference estimate based on a pilot received from the transmitter. The receiver may then perform data detection for the transmitter based on the channel and interference estimates.

The receiver may obtain received SC-FDMA symbols for each time-frequency block used by the transmitter. For each received SC-FDMA symbol, the receiver removes the cyclic prefix to obtain K input samples, performs a K-point DFT on the K input samples to obtain K frequency-domain received values, retains the N received values for the N subbands used by the transmitter, and discards the remaining K−N received values. The receiver obtains received pilot values for each pilot SC-FDMA symbol (which is an SC-FDMA symbol for pilot) and obtains received data values for each data SC-FDMA symbol (which is an SC-FDMA symbol for data).

The received pilot values may be expressed as:

$$R_p(k) = H(k) \cdot P(k) + N(k), \text{ for } k \in K_p, \qquad \text{Eq (1)}$$

where $P(k)$ is a transmitted pilot value for subband k;

$H(k)$ is a complex gain for the wireless channel for subband k;

$R_p(k)$ is a received pilot value for subband k;

$N(k)$ is the noise and interference for subband k; and $K_p$ is the set of P pilot subbands.

The receiver may derive the channel and interference estimates in various manners. In an embodiment, the receiver estimates the frequency response of the wireless channel based on a minimum mean-square error (MMSE) technique, as follows:

$$\hat{H}(k) = \frac{R_p(k) \cdot P^*(k)}{|P(k)|^2 + \hat{N}_0}, \quad \text{for } k \in K_p, \qquad \text{Eq (2)}$$

where $\hat{H}(k)$ is a channel gain estimate for subband k and "*" denotes a complex conjugate. If $|P(k)|=1$ for all values of k, then equation (2) may be expressed as:

$$\hat{H}(k) = \frac{R_p(k) \cdot P^*(k)}{1 + \hat{N}_0}, \quad \text{for } k \in K_p. \qquad \text{Eq (3)}$$

In an embodiment, the receiver derives an interference estimate $\hat{N}_0$ based on an averaging scheme, as follows:

$$\hat{N}_0 = \frac{1}{P} \cdot \sum_{k \in K_p} |R_p(k) - P(k) \cdot \hat{H}(k)|^2. \qquad \text{Eq (4)}$$

As shown in equations (2) through (4), the interference estimate $\hat{N}_0$ may be used to derive the channel estimates $\hat{H}(k)$, which may then be used to derive a new interference estimate. The channel and interference estimation may be iteratively performed for multiple iterations to derive higher quality channel and interference estimates.

Equation (4) assumes that the interference level is constant across all P pilot subbands. The averaging may be performed over smaller subsets of pilot subbands, e.g., if the interference levels on different subbands are expected to be different. For example, an interference estimate may be derived for the first P/2 pilot subbands, and another interference estimate may be derived for the last P/2 pilot subbands. It may be desirable to derive multiple interference estimates when a user is allocated more subbands than the minimum assignment size. For example, the minimum assignment size for an IFDMA system may be one set of 16 subbands, and a user may be allocated two sets, or a total of 32 subbands. The interference level on the user's even-numbered subbands (which are for a first subband set) may be different from the interference level on the user's odd-numbered subbands (which are for a second subband set) since these two subband sets may be allocated to different users in the neighbor sectors. The user may then average the interference over the even-numbered subbands to obtain a first interference estimate for the first subband set and may average the interference over the odd-numbered subbands to obtain a second interference estimate for the second subband set. The user may use the first interference estimate for channel estimation and data detection for the first subband set and may use the second interference estimate for channel estimation and data detection for the second subband set.

In another embodiment, the receiver derives an interference estimate based on orthogonal dimensions. The receiver obtains P received pilot values for P pilot subbands. These P received pilot values constitute a vector in P-dimensional space and may, in principle, be used to estimate P parameters about the wireless channel. However, the wireless channel tends to have only few parameters to be estimated. For example, a narrowband slowly-varying wireless channel may be assumed to be constant across both frequency and time, and a single parameter for channel gain may be estimated based on the received pilot values. As another example, the wireless channel may be assumed to vary linearly in frequency k and time t as $a_1 + a_2 \cdot k + a_3 \cdot t$. For this example, three parameters $a_1$, $a_2$ and $a_3$ may be estimated based on the received pilot values. In general, if there are L parameters for the wireless channel, then L dimensions of the P-dimensional vector may be used to estimate these P parameters, and P−L dimensions are available for interference estimation.

The vector of P received pilot values (i.e., the received vector) may be denoted as $\underline{r}_p = [R_p(1), R_p(2), \ldots, R_p(P)]^T$, where "$T$" denotes a transpose. A P×P unitary matrix may be defined as $\underline{V} = [\underline{v}_1, \underline{v}_2, \ldots, \underline{v}_P]$, where $\underline{v}_j$, for $j \in \{1, \ldots, P\}$, is a P×1 vector/column. The unitary matrix $\underline{V}$ is characterized by the property $\underline{V}^H \cdot \underline{V} = \underline{I}$, where $\underline{I}$ is the identity matrix and "$H$" denotes a conjugate transpose. The columns of the unitary matrix $\underline{V}$ are orthogonal to one another, and each column has unit power. The unitary matrix $\underline{V}$ may be generated based on a channel model so that the channel variations are constrained to the first L columns of $\underline{V}$. The last P−L columns of $\underline{V}$ may then be used for interference estimation since the channel is not present in these dimensions. For example, if P=2 and the channel response is constant in frequency, then the unitary matrix $\underline{V}$ may be a 2×2 Walsh matrix $$\underline{V}_{2 \times 2} = \begin{bmatrix} 1 & 1 \\ 1 & -1 \end{bmatrix}$$

(not normalized for unit power per column). The first row of $\underline{V}_{2 \times 2}$ may be used for channel estimation since multiplying by the first row averages the received pilot values. The second row of $\underline{V}_{2 \times 2}$ cancels the contribution of the transmitted pilot and hence may be used to estimate interference.

Interference estimation based on orthogonal dimensions may be performed as follows. P−L vectors (e.g., the last P−L vectors) in the unitary matrix $\underline{V}$ are selected for use as P−L orthogonal vectors. For each of the P−L orthogonal vectors, the received vector $\underline{r}_p$ is projected onto that orthogonal vector, and the energy of the resulting vector is computed, as follows:

$$E_j = \|\underline{r}_p^H \cdot \underline{v}_j\|^2, \text{ for } j = P-L+1, \ldots, P, \qquad \text{Eq (5)}$$

where $E_j$ is the energy for the projection of the received vector $\underline{r}_p$ onto the j-th orthogonal vector $\underline{v}_j$. An interference estimate may be obtained by averaging the energies for all P−L orthogonal vectors, as follows:

$$\hat{N}_0 = \frac{1}{P-L} \cdot \sum_{j=P-L+1}^{P} E_j. \qquad \text{Eq (6)}$$

If multiple (Q) users are allocated the same set of pilot subbands in a given sector, then a total of L·Q dimensions may be used for channel estimation for the Q users. The remaining P−L·Q dimensions may be used for interference estimation.

In yet another embodiment, the receiver performs channel and interference estimation jointly. The received pilot values may be expressed in vector form as follows:

$$\underline{r}_p = \sqrt{E_p} \cdot \underline{p} \circ \underline{h}_p + \sqrt{N_0} \cdot \underline{n}, \qquad \text{Eq (7)}$$

where $\underline{p}$ is a P×1 vector containing P pilot values sent on the P pilot subbands;

$\underline{h}_p$ is a P×1 vector containing P channel gains for the P pilot subbands;

$\underline{n}$ is a vector of normalized noise and interference;

$E_p$ is the energy of each pilot value;

$N_0$ is the combined noise and interference energy for each pilot value; and

"$\circ$" denotes an element-by-element multiplication operation.

The channel response vector may be given as $\underline{h}_p = [H(1), H(2), \ldots, H(P)]^T$. The noise and interference is assumed to be independent identically distributed (i.i.d.) with zero mean, unit variance, and circular Gaussian distribution.

A P×P covariance matrix $\underline{R}_{pp}$ for the channel response vector $\underline{h}_p$ may be expressed as:

$$\underline{R}_{pp} = E\{\underline{h}_p \cdot \underline{h}_p^H\}, \qquad \text{Eq (8)}$$

where $E\{\ \}$ denotes an expectation operation. The covariance matrix $\underline{R}_{pp}$ contains complex values and may be determined based on a model for the wireless channel, computer simulation, empirical measurement, and so on.

The receiver may derive an MMSE channel estimate for the P pilot subbands as follows:

$$\hat{\underline{h}}_p = \underline{R}_{pp} \cdot [\underline{R}_{pp} + (E_p/\hat{N}_0)^{-1} \cdot \underline{I}_p]^{-1} \cdot \underline{r}_p, \quad \text{Eq (9)}$$

where $\underline{I}_p$ is a P×P identity matrix and $\hat{\underline{h}}_p$ is an MMSE estimate of $\underline{h}_p$. Equation (2) provides an MMSE channel gain estimate for each individual pilot subband. Equation (9) provides MMSE channel gain estimates for all P pilot subbands based on a channel model and attempts to minimize the overall error across all P pilot subbands.

If the interference level $N_0$ is known at the receiver, then equation (9) provides the desired channel estimate for the pilot subbands. The accuracy of the channel estimate $\hat{\underline{h}}_p$ depends on the accuracy of the estimate of $N_0$.

The receiver may derive an error vector as follows:

$$\underline{e} = \underline{r}_p - \underline{p} \circ \hat{\underline{h}}_p, \quad \text{Eq (10)}$$

where $\underline{e} = [e(1), e(2), \ldots, e(P)]^T$ is a P×1 error vector.

The receiver may derive an interference estimate $\hat{N}_0$ as follows:

$$\hat{N}_0 = \frac{1}{P-L} \cdot \sum_{k=1}^{P} |e(k)|^2. \quad \text{Eq (11)}$$

In equation (11), the interference estimate is obtained by summing the energies of the elements of $\underline{e}$ and dividing the total energy by P−L, which corresponds to the number of dimensions available for interference estimation. The total energy may also be scaled by other values instead of P−L.

The channel estimation in equation (9) and the interference estimation in equations (10) and (11) may be iteratively performed for multiple iterations. For the first iteration, an initial interference estimate $\hat{N}_{0,init}$ is used in equation (9) to derive the channel estimate $\hat{\underline{h}}_p$. The channel estimate is then used in equations (10) and (11) to derive an interference estimate $\hat{N}_0$, which is used for channel estimation in the next iteration. In a typical scenario, five to ten iterations may be sufficient to obtain reasonably accurate channel and interference estimates.

Pseudo code and mathematical expressions for the iterative channel and interference estimation may be expressed as follows:

$\hat{N}_0 = \hat{N}_{0,init};$ while iterations $\hat{\underline{h}}_p = \underline{R}_{pp} \cdot [\underline{R}_{pp} + (E_p/\hat{N}_0)^{-1} \cdot \underline{I}_p]^{-1} \cdot \underline{r}_p;$ $\hat{N}_0 = \frac{1}{P-L} \cdot \|\underline{r}_p - \underline{p} \circ \hat{\underline{h}}_p\|^2;$ end The pseudo code given above utilizes a specific channel estimation technique and a specific interference estimation technique. In general, any channel estimation technique may be iterated with any interference estimation technique.

For channel estimation, over estimation of $N_0$ (i.e., using a larger value for $\hat{N}_0$ than the actual value) results in the term $(E_p/\hat{N}_0)^{-1} \cdot \underline{I}_p$ being given more weight and the term $\underline{R}_{pp}$ (which models the channel variations in time and frequency) being given less weight. Hence, more averaging may be needed. Conversely, under estimation of $N_0$ (i.e., using a smaller value for $\hat{N}_0$ than the actual value) results in the term $\underline{R}_{pp}$ being given more weight and the term $(E_p/\hat{N}_0)^{-1} \cdot \underline{I}_p$ being given less weight. Since $\underline{R}_{pp}$ tends to be a low rank matrix, its inverse tends to have large eigenvalues and this magnifies the noise. A more accurate knowledge of $N_0$ can provide a more accurate estimate of the channel response, especially when there is a small number of pilot subbands.

The initial value of $\hat{N}_0$ which is $\hat{N}_{0,init}$, may be selected based on the available knowledge of the interference level in the system. A conservative value for $\hat{N}_{0,init}$ (i.e., a $\hat{N}_{0,init}$ value that is significantly greater than the actual $N_0$) may avoid divergence of the estimation error for the first few iterations. An aggressive value for $\hat{N}_{0,init}$ (i.e., a $\hat{N}_{0,init}$ value that is significantly smaller than the actual $N_0$) may be used if the pilot overhead is small, or else estimation accuracy may not improve by performing the iterative algorithm.

As shown in equation (9), for each iteration, a matrix $[\underline{R}_{pp} + (E_p/\hat{N}_0)^{-1} \cdot \underline{I}_p]$ is computed with the interference estimate $\hat{N}_0$ obtained from a prior iteration, and a matrix inversion is performed on this matrix. The matrix inversion may be computationally intensive, especially for a large matrix due to a large number of pilot subbands. For example, a 16×16 matrix is inverted for 16 pilot subbands, which is computationally intensive. The matrix inversion may be avoided as described below.

The P×P covariance matrix $\underline{R}_{pp}$ may be decomposed based on eigenvalue decomposition, as follows:

$$\underline{R}_{pp} = \underline{U} \cdot \underline{\Lambda} \cdot \underline{U}^H \quad \text{Eq (12)}$$

where $\underline{U}$ is a P×P unitary matrix; and $\underline{\Lambda}$ is a P×P diagonal matrix containing the eigenvalues of $\underline{R}_{pp}$.

The diagonal matrix $\underline{\Lambda}$ contains R non-zero real values along the diagonal and zeros elsewhere, where R is the rank of $\underline{R}_{pp}$ and R≦P.

A P×P intermediate matrix $\underline{B}$ may be defined as follows:

$$\underline{B} = \underline{U} \cdot \underline{\Lambda}. \quad \text{Eq (13)}$$

An MMSE channel estimate for the P pilot subbands may be computed as:

$$\hat{\underline{h}}_p = \underline{B} \cdot [\underline{\Lambda} + (E_p/\hat{N}_0)^{-1} \cdot \underline{I}_p]^{-1} \cdot \underline{U}^H \cdot \underline{r}_p, \quad \text{Eq (14)}$$

As shown in equation (14), $[\underline{\Lambda} + (E_p/\hat{N}_0)^{-1} \cdot \underline{I}_p]$ is a P×P diagonal matrix containing P scalars. The inversion of this diagonal matrix may be performed with P scalar inversions, which is much less computation than the inversion of an arbitrary P×P matrix. The intermediate matrix $\underline{B}$ allows the channel estimate $\hat{\underline{h}}_p$ to be derived without having to perform a matrix inversion for an arbitrary matrix.

Pseudo code and mathematical expressions for the iterative channel and interference estimation, without matrix inversion, may be expressed as follows:

$\underline{B} = \underline{U} \cdot \underline{\Lambda};$ $\hat{N}_0 = \hat{N}_{0,init};$ while iterations $\hat{\underline{h}}_p = \underline{B} \cdot [\underline{\Lambda} + (E_p/\hat{N}_0)^{-1} \cdot \underline{I}_p]^{-1} \cdot \underline{U}^H \cdot \underline{r}_p;$ $\hat{N}_0 = \frac{1}{P-L} \cdot \|\underline{r}_p - \underline{p} \circ \hat{\underline{h}}_p\|^2;$ end Matrices $\underline{B}$ and $\underline{U}$ may be computed once and stored in a memory. The memory requirements for $\underline{B}$ and $\underline{U}$ may be reduced by truncating R for the rank of $\underline{R}_{pp}$. If $\Lambda$ contains R non-zero diagonal elements, then P–R columns of $\Lambda$ contain all zeros, and $\underline{U} \cdot \Lambda$ is effectively a P×R matrix. Since R represents the number of free parameters (or degrees of freedom) of the wireless channel in frequency and time, R may be selected to be smaller than P without noticeable performance degradation. In an embodiment, R is selected to be smaller than P by a factor of two or more. In another embodiment, R is selected to be less than a predetermined upper limit (e.g., 10). In general, R may be selected based on various factors such as the desired performance, computational complexity, and so on.

In general, the receiver may derive the channel estimate and the interference estimate either individually or jointly. The receiver may also derive the channel estimate and the interference estimate either once or iteratively. For example, the receiver may iteratively derive the channel and interference estimates based on equations (2) and (4), based on equations (2), (5) and (6), based on equations (9), (10) and (11), based on equations (14), (10) and (11), based on either of the pseudo codes given above, and so on.

If the data subbands are the same as the pilot subbands, then the channel estimate for the pilot subbands may be used for data detection and/or receiver spatial processing. If the data subbands are different from the pilot subbands, or even if the data subbands and the pilot subbands are the same, a channel estimate may be derived for the data subbands based on the channel estimate for the pilot subbands and the interference estimate.

If all N subbands in a subband set are used for data transmission, then an N×1 vector $\underline{h}_d$ containing the channel gains for the N subbands may be defined as $\underline{h}_d = [H(1), H(2), \ldots, H(N)]^T$. An N×P covariance matrix $\underline{R}_{dp}$ may be expressed as:

$$\underline{R}_{dp} = E\{\underline{h}_d \cdot \underline{h}_p^H\}. \qquad \text{Eq (15)}$$

The covariance matrix $\underline{R}_{dp}$ may be determined based on a model for the wireless channel, computer simulation, empirical measurement, and so on. $\underline{R}_{dp}$ captures variation in time as well, so that a channel estimate for the data subbands may be different than the channel estimate for the pilot subbands even if the data subbands are the same as the pilot subbands.

The receiver may derive an MMSE channel estimate for the N subbands as follows:

$$\hat{\underline{h}}_d = \underline{R}_{dp} \cdot [\underline{R}_{pp} + (E_p/\hat{N}_0)^{-1} \cdot \underline{I}_p]^{-1} \cdot \underline{r}_p, \qquad \text{Eq (16)}$$

where $\hat{\underline{h}}_d$ is an MMSE estimate of $\underline{h}_d$. The receiver may also derive a channel estimate for the N subbands based on other interpolation schemes.

The receiver may use the channel and interference estimates for data detection. For example, the receiver may perform data detection (or equalization) based on an MMSE technique, as follows:

$$Z_d(k) = \frac{R_d(k) \cdot \hat{H}^*(k)}{|\hat{H}(k)|^2 + \hat{N}_0}, \quad \text{for } k \in K_d, \qquad \text{Eq (17)}$$

where $R_d(k)$ is a received data value for subband k, $Z_d(k)$ is a detected data value for subband k, and $K_d$ is the set of data subbands. Equation (17) is for data detection for one antenna at the receiver.

The receiver may also use the channel and interference estimates for receiver spatial processing, if the receiver is equipped with multiple antennas. The receiver may form a channel response matrix $\underline{H}$ based on the channel estimates for all transmitters transmitting on the same time-frequency block. The receiver may then derive a spatial filter matrix $\underline{M}$ based on the channel response matrix and the interference estimate. For example, the receiver may derive the spatial filter matrix based on an MMSE technique, as follows:

$$\underline{M} = \underline{D} \cdot [\underline{H}^H \cdot \underline{H} + \hat{N}_0 \cdot \underline{I}]^{-1} \cdot \underline{H}^H, \qquad \text{Eq (18)}$$

where $\underline{D} = \text{diag}\{[\underline{H}^H \cdot \underline{H} + \hat{N}_0 \cdot \underline{I}]^{-1} \cdot \underline{H}^H \cdot \underline{H}\}^{-1}$. The receiver may perform receiver spatial processing based on the spatial filter matrix to obtain detected data values for each transmitter.

The receiver may also use the interference estimate for decoding. For example, the receiver may identify more reliable symbols (e.g., symbols observing less interference) based on the interference estimate and may give these symbols more weight in the decoding process. The weighting of the symbols based on the interference estimate may improve decoding performance for certain codes such as, e.g., convolutional codes, Turbo codes, and so on.

Figure 7:
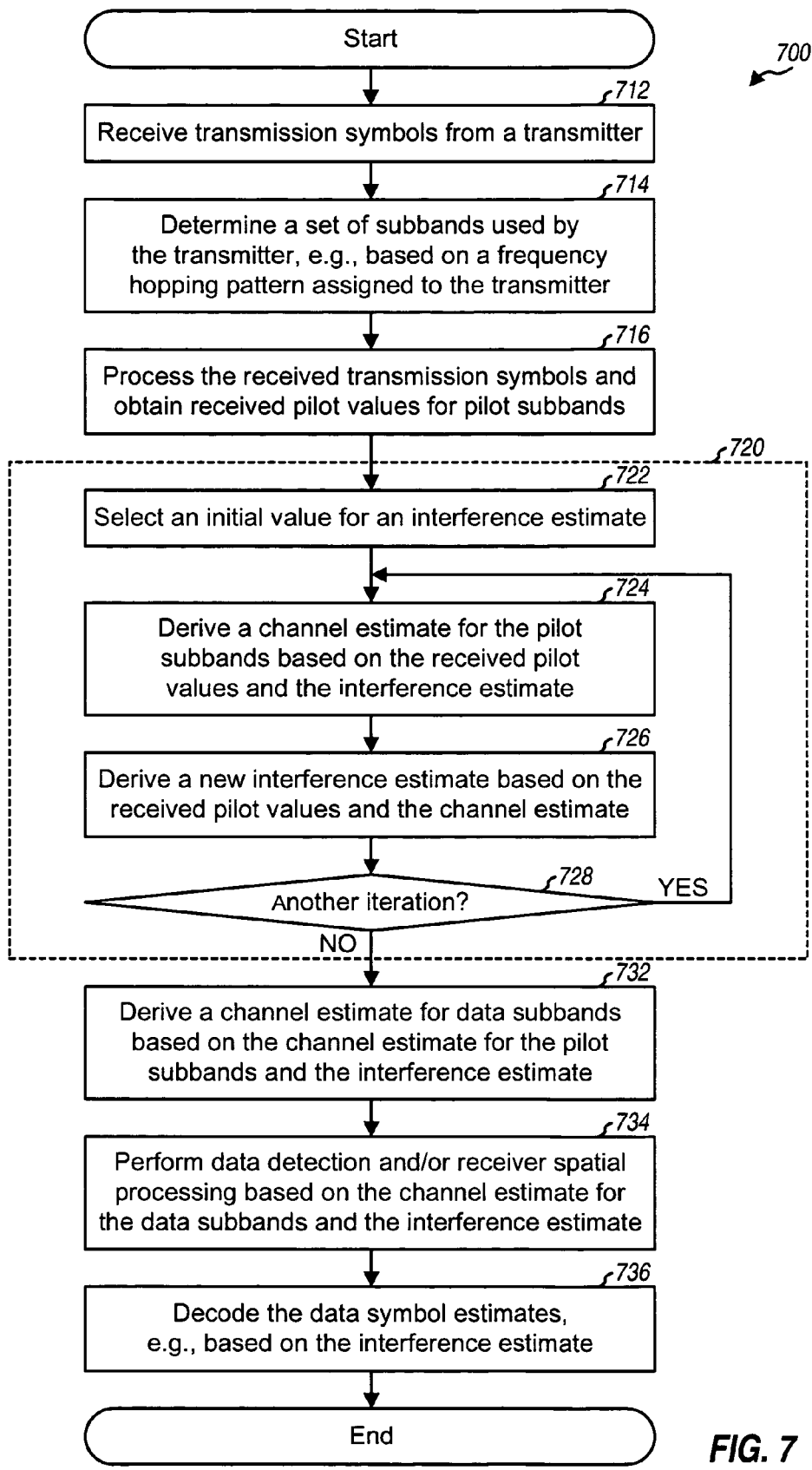
FIG. 7 shows a process to receive a data transmission.

FIG. 7 shows a process 700 performed by a receiver to recover a data transmission from a transmitter. The receiver receives transmission symbols from the transmitter (block 712) and determines a set of subbands used by the transmitter (e.g., based on a frequency hopping pattern assigned to the transmitter) (block 714). The transmission symbols may have been generated with an SC-FDMA scheme such as IFDMA, LFDMA, or EFDMA. The receiver processes the received transmission symbols for the set of subbands, obtains received pilot values for subbands and symbol period(s) used for pilot transmission, and obtains received data values for subbands and symbol period(s) used for data transmission (block 716).

The receiver may iteratively perform channel and interference estimation for the transmitter (block 720). The receiver selects an initial value for the interference estimate (block 722). This initial value may be, e.g., the interference estimate obtained for a previous time-frequency block, a long-term average of the interference estimate, an interference estimate obtained by projecting the received pilot values onto orthogonal dimensions, or some other value. The receiver then derives a channel estimate for the pilot subbands based on the received pilot values and the interference estimate, e.g., using the MMSE technique as shown in equation (9) or (14) (block 724). The receiver derives a new interference estimate (i.e., updates the interference estimate) based on the received pilot values and the channel estimate, e.g., as shown in equations (10) and (11) (block 726). The receiver repeats the derivation of the channel estimate and the interference estimate for multiple iterations until a termination condition is encountered, as determined in block 728. The termination condition may be encountered, e.g., if a predetermined number of iterations have been completed.

The receiver may derive a channel estimate for the data subbands based on the channel estimate for the pilot subbands and the interference estimate (block 732). The receiver then performs data detection and/or receiver spatial processing on the received data values based on the channel estimate for the data subbands and the interference estimate and obtains data symbol estimates (block 734). The receiver may then demodulate, deinterleave, and decode the data symbol estimates, where the decoding may be based on the interference estimate (block 736).

Figure 8:
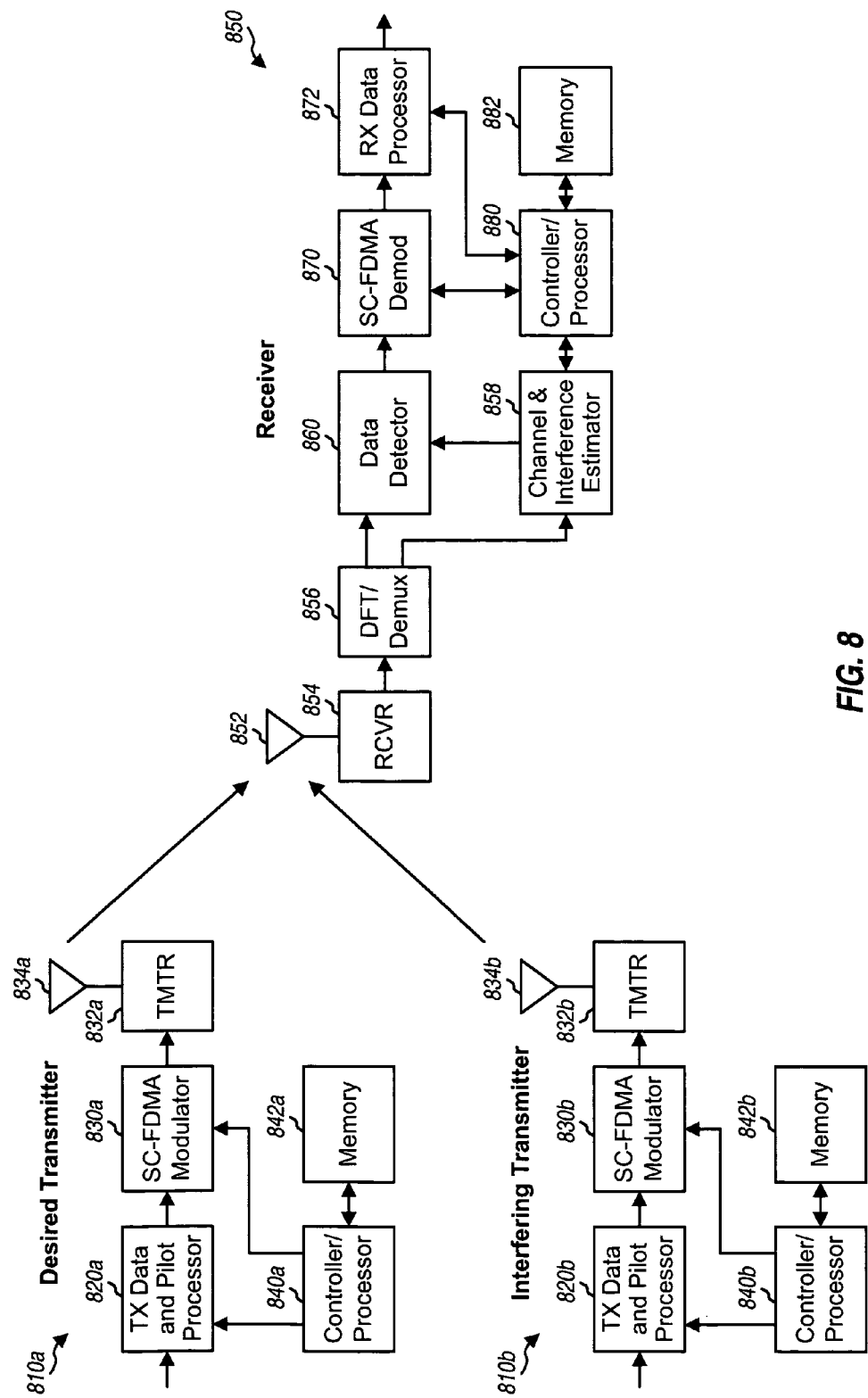
FIG. 8 shows a block diagram of two transmitters and a receiver.

FIG. 8 shows an embodiment of two transmitters 810*a* and 810*b* and a receiver 850. Transmitter 810*a* is a desired transmitter whose transmission is being recovered by receiver 850. Transmitter 810*b* is an interfering transmitter whose transmission causes interference to the desired transmitter. For the reverse link, each transmitter 810 may be part of a terminal, and receiver 850 may be part of a base station. For the forward link, each transmitter 810 may be part of a base station, and receiver 850 may be part of a terminal. For simplicity, each transmitter 810 is equipped with a single antenna 834, and receiver 850 is also equipped with a single antenna 852. For clarity, the following description assumes the use of SC-FDMA.

At each transmitter 810, a transmit (TX) data and pilot processor 820 encodes, interleaves, and symbol maps data (e.g., traffic data and signaling) and generates data symbols. Processor 820 also generates pilot symbols and multiplexes the data symbols and pilot symbols. As used herein, a data symbol is a modulation symbol for data, a pilot symbol is a modulation symbol for pilot, a modulation symbol is a complex value for a point in a signal constellation (e.g., for PSK or QAM), and a symbol is a complex value. An SC-FDMA modulator 830 performs SC-FDMA modulation (e.g., for IFDMA, LFDMA, or EFDMA) and generates SC-FDMA symbols. A transmitter unit (TMTR) 832 processes (e.g., converts to analog, amplifies, filters, and frequency upconverts) the SC-FDMA symbols and generates a radio frequency (RF) modulated signal, which is transmitted via antenna 834.

At receiver 850, antenna 852 receives the RF modulated signals from transmitters 810a and 810b and provides a received signal. A receiver unit (RCVR) 854 conditions (e.g., filters, amplifies, frequency downconverts, and digitizes) the received signal and provides input samples. A DFT unit 856 performs a DFT on the input samples for each symbol period and provides frequency-domain values for that symbol period. A demultiplexer (Demux) 856 provides frequency-domain values for pilot (or received pilot values) to a channel and interference estimator 858 and provides frequency-domain values for data (or received data values) to a data detector 860. Estimator 858 derives a channel estimate and an interference estimate for transmitter 810a based on the received pilot values and using any of the estimation schemes described above. Data detector 860 performs data detection on the received data values, e.g., as shown in equation (17). An SC-FDMA demodulator 870 performs an IDFT on the detected data values for each symbol period and provides data symbol estimates, which are estimates of the data symbols sent by transmitter 810a. An RX data processor 872 demodulates, deinterleaves, and decodes the data symbol estimates and provides decoded data for transmitter 810a. In general, the processing by receiver 850 is complementary to the processing by transmitter 810a.

Controllers 840a and 840b and controller 880 direct the operation of various processing units at transmitters 810a and 810b and receiver 850, respectively. Memories 842a and 842b and memory 882 store program codes and data for transmitters 810a and 810b and receiver 850, respectively.

The channel and interference estimation techniques described herein may be implemented by various means. For example, these techniques may be implemented in hardware; software, or a combination thereof. For a hardware implementation, the processing units used to perform channel and interference estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the techniques may be implemented with modules (e.g., procedures, functions, and so on) that perform the functions described herein. The software codes may be stored in a memory (e.g., memory 882 in FIG. 8) and executed by a processor (e.g., processor 880). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    a processor operative to receive transmission symbols generated with a single-carrier frequency division multiple access (SC-FDMA) scheme or a multi-carrier frequency division multiple access (MC-FDMA) scheme and containing data and pilot on a set of frequency subbands selected from among multiple sets of frequency subbands, and to derive an interference estimate based on the received transmission symbols; and
    a memory coupled to the processor;
    wherein the processor is operative to estimate interference on each frequency subband in the set of frequency subbands and to average the estimated interference across the set of frequency subbands to derive the interference estimate.

2. The apparatus of claim 1, wherein the processor is further operative to obtain a vector of received pilot values based on the received transmission symbols, to project the vector of received pilot values onto multiple orthogonal vectors, and to average across the multiple orthogonal vectors to derive the interference estimate.

3. The apparatus of claim 1, wherein the processor is further operative to derive multiple interference estimates for multiple subsets of the set of frequency subbands.

4. The apparatus of claim 1, wherein the processor is further operative to derive a channel estimate bases on the received transmission symbols and the interference estimate.

5. The apparatus of claim 1, wherein the processor is further operative to perform data detection with the interference estimate.

6. The apparatus of claim 1, wherein the processor is further operative to perform decoding with the interference estimate.

7. The apparatus of claim 1, wherein the processor is further operative to determine different sets of frequency subbands used for transmission in different time slots based on a frequency hopping pattern and to derive interference estimates for the different sets of frequency subbands.

8. A method comprising:
    receiving transmission symbols generated with a single-carrier frequency division multiple access (SC-FDMA) scheme or a multi-carrier frequency division multiple access (MC-FDMA) scheme and containing data and pilot on a set of frequency subbands selected from among multiple sets of frequency subbands; and
    deriving an interference estimate based on the received transmission symbols; wherein the deriving the interference estimate comprises:

estimating interference on each frequency subband in the set of frequency subbands, and averaging the estimated interference across the set of frequency subbands to derive the interference estimate.

9. The method of claim 8, wherein the deriving the interference estimate further comprises:
obtaining a vector of received pilot values bases on the received transmission symbols,
projecting the vector of received pilot values into multiple orthogonal vectors, and
averaging across the multiple orthogonal vectors to derive the interference estimate.

10. An apparatus comprising:
means for receiving transmission symbols generated with a single-carrier frequency division multiple access (SC-FDMA) scheme or a multi-carrier frequency division multiple access (MC-FDMA) scheme and containing data and pilot on a set of frequency subbands selected from among multiple sets of frequency subbands; and
means for deriving an interference estimate based on the received transmission symbols; wherein the means for deriving the interference estimate comprises:
means for estimating interference on each frequency subband in the set of frequency subbands, and
means for averaging the estimated interference across the set of frequency subbands to derive the interference estimate.

11. The apparatus of claim 10, wherein the means for deriving the interference estimate further comprises:
means for obtaining a vector of received pilot values based on the received transmission symbols,
means for projecting the vector of received pilot values onto multiple orthogonal vectors, and
means for averaging across the multiple orthogonal vectors to derive the interference estimate.

12. An apparatus comprising:
a processor operative to receive at least one transmission symbol generated with a single-carrier frequency division multiple access (SC-FDMA) scheme or a multi-carrier frequency division multiple access (MC-FDMA) scheme and to iteratively derive a channel estimate and an interference estimate based on the at least one received transmission symbol, and
a memory coupled to the processor;
wherein the processor is operative to derive the channel estimate based on the at least one received transmission symbol and the interference estimate, to derive the interference estimate based on the at least one received transmission symbol and the channel estimate, and to derive the channel estimate and the interference estimate for multiple iterations.

13. The apparatus of claim 12, wherein the processor is further operative to derive the channel estimate based on a minimum mean-square error (MMSE) technique.

14. The apparatus of claim 12, wherein the processor is further operative to derive the channel estimate based on the at least one received transmission symbol, the interference estimate, and a covariance matrix for a wireless channel.

15. The apparatus of claim 14, wherein the processor is further operative to perform decomposition of the covariance matrix to obtain a unitary matrix and a diagonal matrix, to derive an intermediate matrix based on the unitary matrix and the diagonal matrix, and to derive the channel estimate based on the at least one received transmission symbol, the intermediate matrix, and the interference estimate, without performing a matrix inversion.

16. The apparatus of claim 12, wherein the processor is further operative to iteratively derive the channel estimate and the interference estimate for pilot subbands and to derive a second channel estimate for data subbands based on the channel estimate and the interference estimate for the pilot subbands.

17. The apparatus of claim 12, wherein the processor is further operative to select an initial value for the interference estimate.

18. The apparatus of claim 12, wherein the processor is further operative to perform data detection with the channel estimate and the interference estimate.

19. The apparatus of claim 12, wherein the processor is further operative to perform data detection with the channel estimate and the interference estimate.

20. The apparatus of claim 12, wherein the processor is further operative to determine different sets of frequency subbands used for transmission in different time slots based on a frequency hopping pattern and to iteratively derive channel estimates and interference estimates for the different sets of frequency subbands.

21. A method comprising:
receiving at least one transmission symbol generated with a single-carrier frequency division multiple access (SC-FDMA) scheme or a multi-carrier frequency division multiple access (MC-FDMA) scheme; and
iteratively deriving a channel estimate and an interference estimate based on the at least one received transmission symbol; wherein the iteratively deriving the channel estimate and the interference estimate comprises:
deriving the channel estimate based on the at least one received transmission symbol and the interference estimate,
deriving the interference estimate based on the at least one received transmission symbol and the channel estimate, and
repeating the deriving the channel estimate and the deriving the interference estimate for multiple iterations.

22. The method of claim 21, further comprising:
performing data detection or receiver spatial processing with the channel estimate and the interference estimate.

23. An apparatus comprising:
means for receiving at least one transmission symbol generated with a single- carrier frequency division multiple access (SC-FDMA) scheme or a multi-carrier frequency division multiple access (MC-FDMA) scheme; and
means for iteratively deriving a channel estimate and an interference estimate based on the at least one received transmission symbol;
wherein the means for iteratively deriving the channel estimate and the interference estimate comprises:
means for deriving the channel estimate based on the at least one received transmission symbol and the interference estimate,
means for deriving the interference estimate based on the at least one received transmission symbol and the channel estimate, and
means for repeating the derivation of the channel estimate and the interference estimate for multiple iterations.

24. The apparatus of claim 23, further comprising:
means for performing data detection or receiver spatial processing with the channel estimate and the interference estimate.

25. An apparatus comprising:
a processor operative to receive at least one transmission symbol generated with a single-carrier frequency division multiple access (SC-FDMA) scheme or a multi-carrier frequency division multiple access (MC-FDMA) scheme, to process the at least one received transmission symbol to obtain reveived pilot values for a set of frequency subbands, to protect the received pilot values onto multiple orthogonal vectors, and to derive an interference estimate based on the projection of the received pilot values onto the multiple orthogonal vectors; and a memory coupled to the processor; wherein the processor is operative to average across the multiple orthogonal vectors to derive the interference estimate.

26. The apparatus of claim 25, wherein the processor is further operative to compute energy of the projection of the received pilot values onto each orthogonal vector and to average energies of the projection of the received pilot values onto the multiple orthogonal vectors to derive the interference estimate.

27. The apparatus of claim 25, wherein the multiple orthogonal vectors are columns of a unitary matrix.

28. An apparatus comprising:
a processor operative to determine a set of frequency subbands to use for transmission and to generate transmission symbols with data and pilot being sent on the set of frequency subbands, wherein the transmission symbols are generated with a single- carrier frequency division multiple access (SC-FDMA) scheme or a multi-carrier frequency division multiple access (MC-FDMA) scheme, wherein the set of frequency subbands is selected from among multiple sets of frequency subbands available for transmission, and wherein neighboring sectors utilize the same multiple sets of frequency subbands and are synchronous; and
a memory coupled to the processor.

29. The apparatus of claim 28, further comprising:
a transmitter operative to transmit the transmission symbols via a reverse link to a base station.

30. The apparatus of claim 28, further comprising:
a transmitter operative to transmit the transmission symbols via a forward link to a terminal.

31. The appatatus of claim 28, wherein the neighboring sectors have a common minimum subband assignment size.

32. The apparatus of claim 28, wherein the processor is operative to determine different sets of frequency subbands to use for transmission in different time slots based on a frequency hopping pattern.

33. A method comprising:
determining a set of frequency subbands to use for transmission, wherein the set of frequency subbands is selected from among multiple sets of frequency subbands available for transmission, and wherein neighboring sectors utilize the same multiple sets of frequency subbands and are synchronous; and
generating transmission symbols with data and pilot being sent on the set of frequency subbands and using a single-carrier frequency division multiple access (SC-FDMA) scheme or a multi-carrier frequency division multiple access (MC-FDMA) scheme.

34. The apparatus of claim 33, further comprising:
determining different sets of frequency subbands to use for transmission in different time slots based on a frequency hopping pattern.

35. An apparatus comprising:
means for determining a set of frequency subbands to use for transmission, wherein the set of frequency subbands is selected from among multiple sets of frequency subbands available for transmission, and wherein neighboring sectors utilize the same multiple sets of frequency subbands and are synchronous; and
means for generating transmission symbols with data and pilot being sent on the set of frequency subbands and using a single-carrier frequency division multiple access (SC-FDMA) scheme or a multi-carrier frequency division multiple access (MC-FDMA) scheme.

36. The apparatus of claim 35, further comprising: means for determining different sets of frequency subbands to use for transmission in different time slots based on a frequency hopping pattern.

37. An apparatus comprising:
a processor operative to receive transmission symbols containing data and pilot on a set of frequency subbands selected from among multiple sets of frequency subbands, and to derive a channel estimate, an interference estimate, or both the channel estimate and the interference estimate based on the received transmission symbols, wherein the transmission symbols are generated with a single-carrier frequency division multiple access (SC-FDMA) scheme or a multi-carrier frequency division multiple access (MC-TDMA) scheme, and wherein neighboring sectors utilize the same multiple sets of frequency subbands and are synchronous; and
a memory coupled to the processor.

38. A non-transitory computer-readable medium having stored thereon computer-executable instructions over a wireless network for:
receiving transmission symbols generated with a single-carrier frequency division multiple access (SC-FDMA) scheme or a multi-carrier frequency division multiple access (MC-FDMA) scheme and containing data and pilot on a set of frequency subbands selected from among multiple sets of frequency subbands; and
deriving an interference estimate based on the received transmission symbols;
wherein the deriving the interference estimate comprises:
estimating interference on each frequency subband in the set of frequency subbands, and
averaging the estimated interference across the set of frequency subbands to derive the interference estimate.

39. A non-transitory computer-readable medium of claim 38, wherein the deriving the interference estimate further comprises:
obtaining a vector of received pilot values based on the received transmission symbols, projecting the vector of received pilot values onto multiple orthogonal vectors, and
averaging across the multiple orthogonal vectors to derive the interference estimate.

40. A non-transtory computer-readable medium having stored thereon computer-executable instructions over a wireless network for:
receiving at least one transmission symbol generated with a single-carrier frequency division multiple access (SC-FDMA) scheme or a multi-carrier frequency division multiple access (MC-FDMA) scheme; and
iteratively deriving a channel estimate and an interference estimate based on the at least one received transmission symbol; wherein the iteratively deriving the channel estimate and the interference estimate comprises:
deriving the channel estimate based on the at least one received transmission symbol and the interference estimate,
deriving the interference estimate based on the at least one received transmission symbol and the channel estimate, and
repeating the deriving the channel estimate and the deriving the interference estimate for multiple iterations.

41. A non-transitory computer-readable medium of claim 40, further comprising:
performing data detection or receiver spatial processing with the channel estimate and the interference estimate.

42. A non-transitory computer-readable medium having stored thereon computer-executable instructions over a wireless network, for:
determining a set of frequency subbands to use for transmission, wherein the set of frequency subbands is selected from among multiple sets of frequency subbands available for transmission, and wherein neighboring sectors utilize the same multiple sets of frequency subbands and are synchronous; and
generating transmission symbols with data and pilot being sent on the set of frequency subbands and using a single-carrier frequency division multiple access (SC-FDMA) scheme or a multi-carrier frequency division multiple access (MC-FDMA) scheme.

43. The non-transitory computer-readable medium of claim 42, further comprising:
determining different sets of frequency subbands to use for transmission in different time slots based on a frequency hopping pattern.

* * * * *